Mar. 5, 1929.  O. H. GOETZ  1,703,931
AUTOMOBILE BUMPER AND CLAMP
Filed Dec. 14, 1926  2 Sheets-Sheet 1
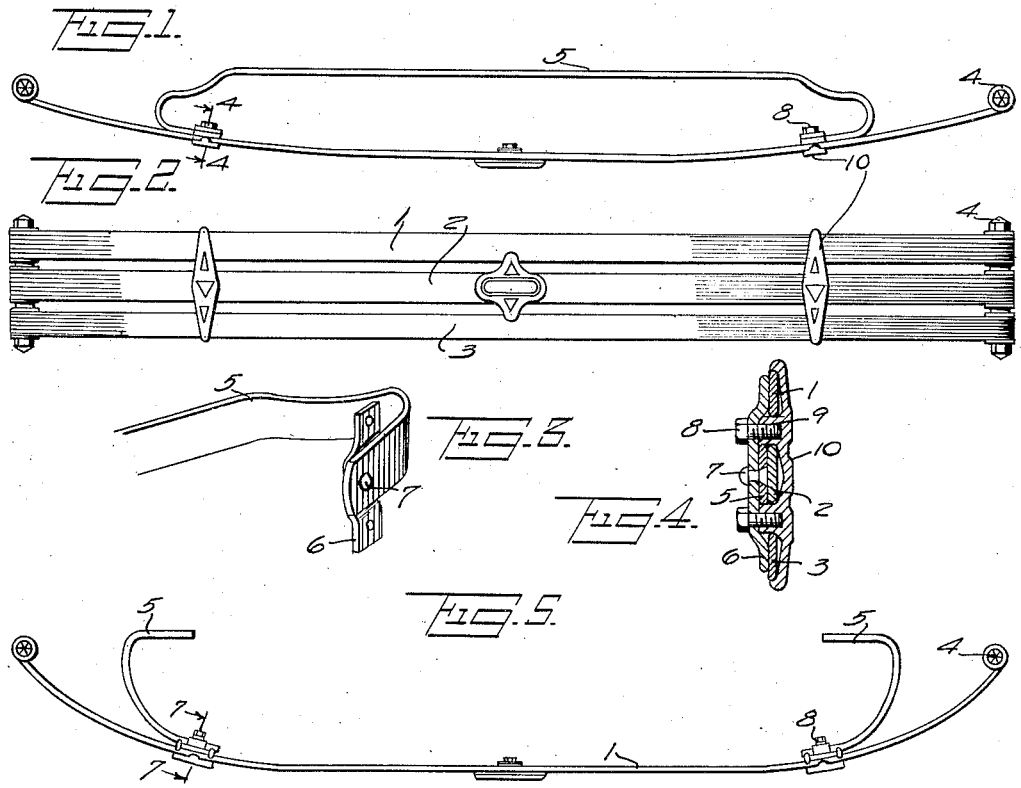
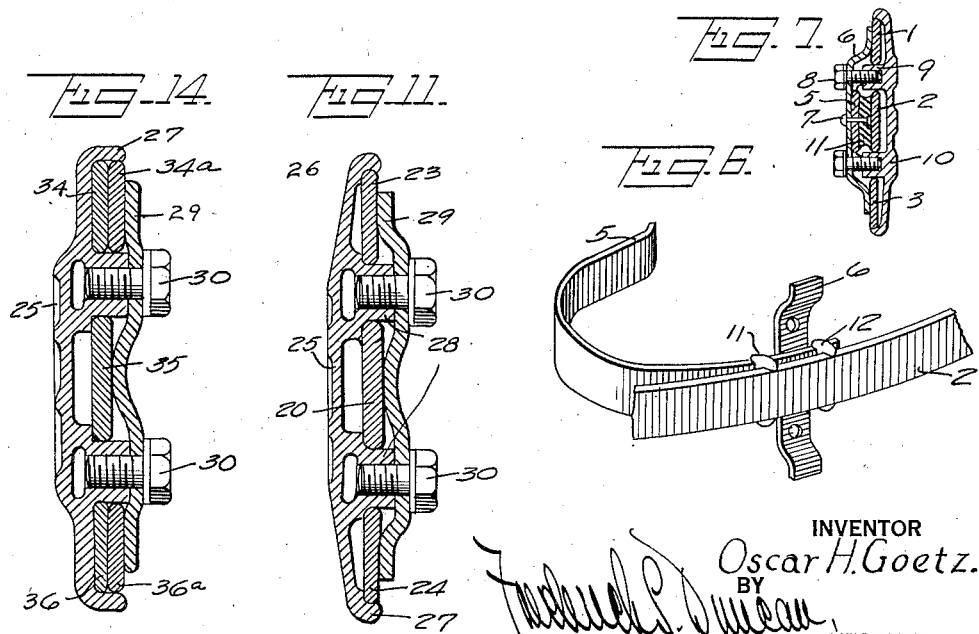
INVENTOR
Oscar H. Goetz.
BY
ATTORNEY Mar. 5, 1929.  O. H. GOETZ  1,703,931
AUTOMOBILE BUMPER AND CLAMP
Filed Dec. 14, 1926   2 Sheets-Sheet 2
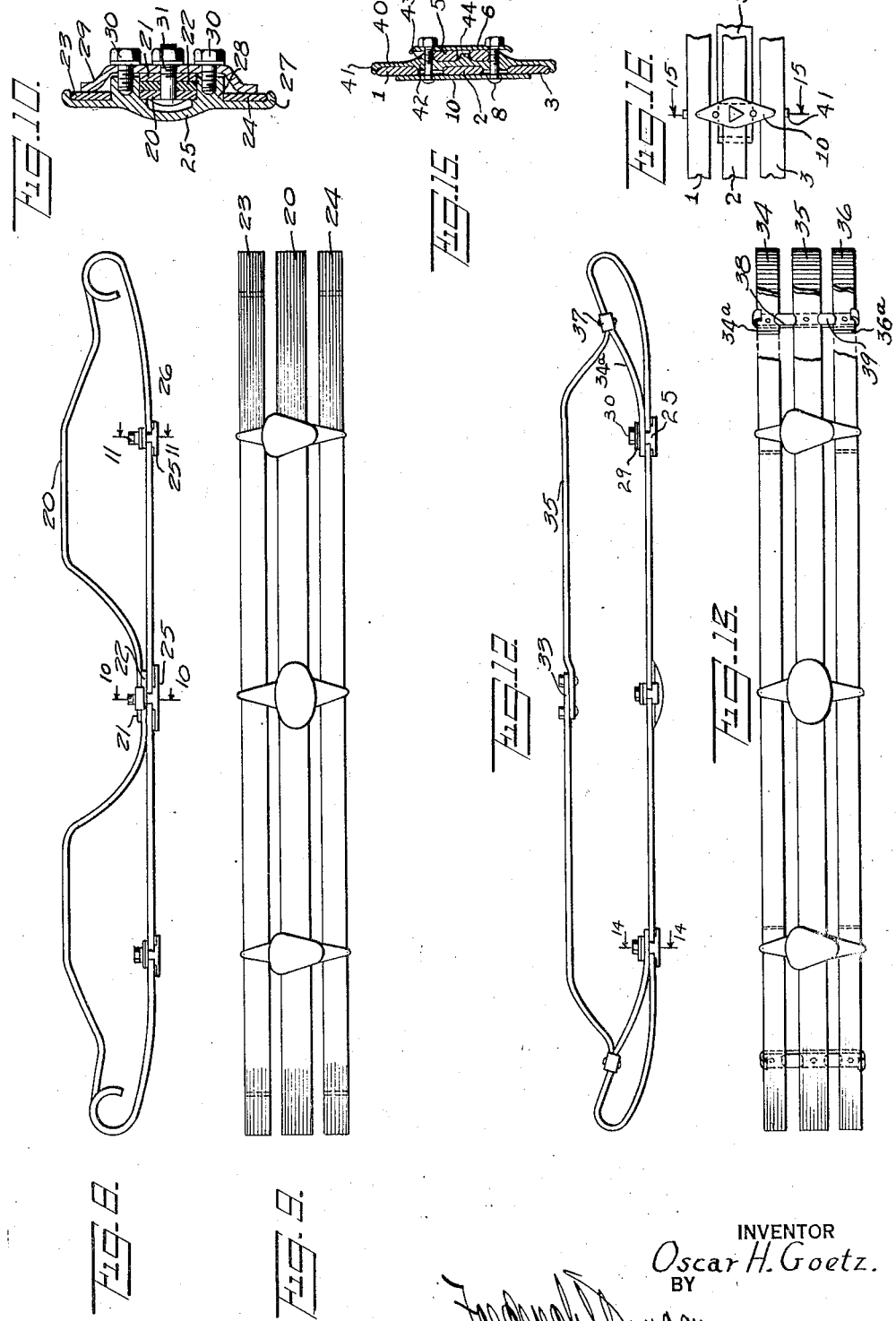
INVENTOR
Oscar H. Goetz.
BY
ATTORNEY Patented Mar. 5, 1929.

1,703,931

UNITED STATES PATENT OFFICE.

OSCAR H. GOETZ, OF CHICAGO, ILLINOIS, ASSIGNOR TO AMERICAN CHAIN COMPANY, INC., A CORPORATION OF NEW YORK.

AUTOMOBILE BUMPER AND CLAMP.

Application filed December 14, 1926. Serial No. 154,726.

This invention relates to automobile bumpers, and more particularly to bumpers of the type commonly known as parallel bar or multi-bar bumpers, comprising several impact bars arranged in superimposed vertical relation, spaced apart, and constituting an impact structure usually supported by one or more back bars or members adapted to be attached to the frame of an automobile, suitable clamping devices being used to hold the bumpers in assembled relation. An object of this invention is to provide an improved bumper of the above type, and also to provide improved clamping means which will securely hold the parts of the bumper together, and which are inexpensive to manufacture, and present a pleasing appearance in use.

Another object of the invention is to provide an improved type of clamp readily adaptable for use with different forms of bumpers of the above general type, and which embodies certain novel advantageous connecting and spacing means that are of universal utility regardless of the specific variations of structure which may be adopted to meet the requirements of particular installations.

In general, the clamps embodying this invention preferably comprise front and rear plates bolted together to form a secure holding device for the bars of the bumper, one of the plates having a boss or bosses adapted to extend between the bars, and serve as spacing means therefor, and preferably having tapped recesses into which the connecting bolts may be screwed.

A clear conception of the construction and further objects of this invention may be had from the following specification and the accompanying drawings in which:

Fig. 1 is a plan view of a bumper embodying the invention.

Fig. 2 is a front view thereof.

Fig. 3 is a fragmentary detail view in perspective of an end of the rear bar and a portion of the preferred form of clamp for connecting the rear bar to the impact bars.

Fig. 4 is a sectional view through 4—4 of Fig. 1 on an enlarged scale.

Fig. 5 is a plan view of a modified form of bumper.

Fig. 6 is a detailed view in perspective of the connection between the middle impact bar and one end of the rear bar of the bumper shown in Fig. 5, and shows the preferred form of clamp for this type of bumper with the front plate removed.

Fig. 7 is an enlarged sectional view on the line 7—7 of Fig. 5.

Fig. 8 discloses in plan view a bumper embodying further modified forms of the invention.

Fig. 9 is a front view of the bumper shown in Fig. 8.

Fig. 10 is an enlarged sectional view through 10—10 of Fig. 8.

Fig. 11 is a similar section through 11—11 of Fig. 8.

Fig. 12 shows in plan view still another form of bumper using a further modified form of the invention.

Fig. 13 is a front view of Fig. 12.

Fig. 14 is an enlarged sectional view through 14—14 of Fig. 12.

Fig. 15 is a sectional view through 15—15 of Fig. 16.

Fig. 16 is a fragmentary view of a modified form of clamp similar to that in Figs. 4 and 7.

The bumper illustrated in Figs. 1 to 3 comprises three impact bars, 1, 2 and 3, formed of flat spring steel and assembled in vertical relation edgewise as shown in Fig. 2. The bars are spaced vertically and joined at each end by any suitable means, such as the bolt and washers indicated at 4. The rear bar 5, is a piece of flat spring steel, bent forward and inward at its ends to form open loops adapted to co-operate with the impact members. To each end of this rear bar is secured, as by a rivet 7, a hasp-shaped strip of metal, 6, constituting the rear plate of a clamping device, and which is provided with holes of a suitable size for accommodating the bolts 8 shown in Fig. 4.

In pursuance of the invention, a front plate 10 is provided, which may conveniently be made as a die casting shaped as shown in Figs. 2 and 4. Lugs or bosses are preferably provided as shown at 9 on the casting 10, and are tapped to accommodate bolts 8, which are passed through the rear plate 6 and between the impact bars 1, 2 and 3, thereby forming a joint as disclosed in Fig. 4. The spacing lugs 9 form spacing means for the impact bars and facilitate the bolting of rear plate 6 to the front plate 10.

A modification of the above type of clamp is shown in Figs. 5, 6 and 7, the numbers of certain parts corresponding with similar parts in Figs. 1 to 4 inclusive.

In Fig. 5 a bracket 5 is shown at each side, and a locating plate 11 is riveted, together with a rear plate 6, to the end of bracket 5. The locating plate 11 provides a simple and effective means for effecting the alignment between each bracket and the corresponding front bar, and may consist of a casting having a flat portion embraced between the front bar 2 and bracket 5, having lugs 12 at its four corners for engagement with the upper and lower edges of bracket 5 and the middle impact bar 2. These locating plates are designed to be used when spaced brackets are thus used to support the impact bars and they tend to maintain the alignment and adjustment between the impact element and the supporting brackets.

The bumper shown in Fig. 8 is composed of a main bar 20, having its ends formed in loops, the continuations rearwardly of which are bent forwardly, as shown, to a point in connection with the front bar portion, in the same horizontal plane. The ends 21 and 22 of the rear bar 20 are then secured in a clamp shown in cross-section in Fig. 10, by which the bar 20 is connected to vertically aligned impact bars 23 and 24, in parallelism with the main bar 20, and having each end formed in a shepherd's crook of the same curvature as the loop ends of bar 20.

The clamp shown in Fig. 10 comprises a metal front plate 25, having lips 27 and bosses 28 between which the bars 20, 23 and 24 are positioned. The bosses or lugs 28 are tapped to receive the bolts 30. A hole is drilled through the center of the front portions of bar 20, and registering holes through the ends 21 and 22 of said bar, of a suitable diameter to receive bolt 31. A rear plate 29, shaped as shown in Fig. 10, is provided with holes suitable to accommodate bolts 30 and 31. Bolt 31 is passed through bar 20 and its ends 21 and 22, and thence through the back plate 29; bolts 30 serving to clamp the front plate 25 to back plate 29, embracing the bars.

The bars 23 and 24 are preferably joined at regions intermediate their ends and mid-position by other clamps, such as that indicated in Fig. 8 by the numeral 26, which is shown in detail in Fig. 11. Clamp 26 is of somewhat similar construction to that already discussed, having a stamped front plate 25, with lips 27 and a pair of bosses 28 for engagement with the bars 20, 23 and 24; the material difference being in the fact that only one bar is held at the center, therefore necessitating a different shape for the rear plate 29, which may be of the shape illustrated.

The bumper shown in Fig. 12 uses a further modified form of clamp. The main bar 35 is constructed in a manner similar to bar 20, with the exception that it is not drawn forward and bolted into a clamp similar to that shown in Fig. 10, but has its ends bolted together at 33, thereby forming a straight attaching bar. The loop ends of bars 34 and 36 are of the same curvature as the loop ends of bar 35, and are drawn forward at an angle to the impact portion of each respective bar and fastened in a clamping means such as disclosed in Fig. 13, at the point where the curvature of bar 35 no longer follows the line of bars 34 and 36, and here a clamp 37 is used to hold the bars in vertical alignment. This clamp consists of a strip of steel having two grooved lugs 38 and 39 (see Fig. 13) on its back portion, and the ends of which are bent to conform to the shape and width of the upper and lower bars 34 and 36. The clamp is slipped into place over the ends of the bars, and then riveted before the ends of the bars are bent into their final form.

The clamp shown in Fig. 14 consists of a front plate 25, constructed as hereinbefore described with the exception that the lips 27 are of sufficient depth to accommodate two thicknesses of bumper bar such as the ends of bars 34 and 36 which are designated as 34$^A$ and 36$^A$, and the contiguous impact portion of each bar. The whole clamp is held together by bolts 30 in a manner similar to that described above.

A still further modification of this type of clamp is shown in Figs. 15 and 16. As the clamp is similar to that shown in Figs. 4 and 7 the same designating numerals will be used where possible. The front plate 10 is formed as shown in Fig. 16 without the lips provided in the former types. Also, in this type the front plate is provided with holes for accommodating bolts 8 instead of the tapped bosses, the principal difference between these types being the use of a center plate 40 having lips 41 and bosses 42 for positioning the bars 1, 2 and 3 of the impact section and holding them in spaced relation. The center plate 40 has bosses 43 on the rear face thereof spaced at a distance equal to the width of a bumper bar for the accommodation of a rear or attaching bar 5. The plate 40 is also provided with a lug 44 which is adapted to register with a hole drilled in the rear bar 5. The clamp is completed by a rear plate 6 which is held tightly against the rear bar 5 by the bolts 8, thereby holding the parts of the clamp in rigid clamping engagement.

The forms of clamp shown in Figs. 8 to 14, inclusive, while claimed generically in the present application, form the subject of specific claims in my co-pending application Ser. No. 304,961, filed September 10, 1928.

I claim:

1. A clamping device for connecting the bars of automobile bumpers of the type having an impact structure including several impact bars arranged in spaced vertical relation, said clamp comprising a front plate and a rear plate adapted to embrace said impact bars one of said plates having spacing bosses to project between said impact bars and means to hold said plates and bars in assembled relation.

2. A clamping device for connecting the bars of automobile bumpers of the type having an impact structure including several impact bars arranged in spaced vertical relation, said clamp comprising a front plate and a rear plate adapted to embrace said impact bars one of said plates having spacing bosses to project between said impact bars and means to hold said plates and bars in assembled relation, said holding means comprising bolts extending from said bosses through said other plate.

3. A clamping device for connecting the bars of automobile bumpers of the type having an impact structure including several impact bars arranged in spaced vertical relation, said clamp comprising a front plate and a rear plate adapted to embrace said impact bars one of said plates having a plurality of spacing bosses to project between said impact bars and means to hold said plates and bars in assembled relation, said holding means comprising bolts screwed into said bosses and passing through said other plate.

4. An automobile bumper comprising three vertically spaced laterally extended flat bars and a clamping device comprising a plate having a plurality of spacing bosses extended between said bars, another plate co-operating with said first mentioned plate to embrace said bars and bolts screwed into said bosses and passing through said other plate.

5. An automobile bumper comprising three vertically spaced laterally extended flat bars and a clamping device comprising a plate having spacing bosses extended between said bars, another plate co-operating with said first mentioned plate to embrace said bars and bolts screwed into said bosses and passing through said other plate and a supporting bar secured to one of said plates and adapted to be attached to an automobile.

6. An automobile bumper comprising three vertically spaced laterally extended flat bars and a clamping device comprising a plate having spacing bosses extended between said bars, another plate co-operating with said first mentioned plate to embrace said bars and bolts screwed into said bosses and passing through said other plate and a supporting bar riveted to one of said plates and adapted to be attached to an automobile.

7. In an automobile bumper, an impact section comprising three vertically spaced laterally extended flat bars, a connector bar having a clamping plate secured thereto, and means for locating and effecting the connection of said connector bar with said impact section.

8. In an automobile bumper, an impact section comprising three vertically spaced laterally extended flat bars, said bars being joined together at their ends, a connector bar having a clamping plate riveted thereto, and a co-operating plate having spacing means to which said clamping plate is bolted to connect said impact section with said connector bar.

9. In an automobile bumper, an impact section comprising three vertically spaced laterally extended flat bars, said bars being joined at their ends, and spacing clamps at intermediate points on said impact section, said spacing clamps respectively comprising a pair of clamping plates one of which is provided with means for positioning said bars, a connector bar having one of said clamping plates secured thereto, said first-mentioned plate being adapted to be joined with said other plate for connecting and positioning said connector bar in relation to said impact section.

10. In an automobile bumper, an impact section comprising three vertically spaced laterally extended flat steel bars, said bars being suitably spaced and joined at their extreme ends, spacing and clamping members at intermediate points on said impact section, said members having lugs thereon for positioning said bars in relation to one another, a connector bar having a clamping plate and a locating plate riveted thereto, said clamping and locating plates being joined with said spacing members for connecting said connector bar to said impact member.

11. A locating member for a bumper having a plurality of bars, said member comprising a flat body plate provided with a plurality of lugs extending out of the plane of said plate into position to embrace a plurality of bumper bars.

12. A locating member for a bumper having a plurality of bars, said member comprising a flat rectangular body plate, provided at each corner with lugs extending out of the plane of said plate on each side into position to embrace said bumper bars.

In testimony whereof, I have signed this specification.

OSCAR H. GOETZ.